(12) United States Patent
Kitao et al.

(10) Patent No.: US 9,136,529 B2
(45) Date of Patent: Sep. 15, 2015

(54) METHOD OF CHARGING AND DISCHARGING A NON-AQUEOUS ELECTROLYTE SECONDARY BATTERY

(75) Inventors: Hideki Kitao, Kobe (JP); Yoshinori Kida, Kobe (JP); Toyoki Fujihara, Naruto (JP)

(73) Assignee: SANYO ELECTRIC CO., LTD., Osaka (JP)

(*) Notice: Subject to any disclaimer, the term of this patent is extended or adjusted under 35 U.S.C. 154(b) by 1803 days.

(21) Appl. No.: 11/526,607

(22) Filed: Sep. 26, 2006

(65) Prior Publication Data

US 2007/0072059 A1    Mar. 29, 2007

(30) Foreign Application Priority Data

Sep. 27, 2005   (JP) .................................. 2005-279950

(51) Int. Cl.
| | |
|---|---|
| *H01M 4/131* | (2010.01) |
| *H01M 4/505* | (2010.01) |
| *H01M 4/525* | (2010.01) |
| *H01M 10/0525* | (2010.01) |
| *H01M 10/44* | (2006.01) |

(52) U.S. Cl.
CPC .............. *H01M 4/131* (2013.01); *H01M 4/505* (2013.01); *H01M 4/525* (2013.01); *H01M 10/0525* (2013.01); *H01M 10/44* (2013.01); *H01M 10/441* (2013.01); *Y02E 60/122* (2013.01)

(58) Field of Classification Search
USPC ......................................................... 429/223
See application file for complete search history.

(56) References Cited

U.S. PATENT DOCUMENTS

| | | | |
|---|---|---|---|
| 6,773,848 B1* | 8/2004 | Nortoft et al. ................. | 429/158 |
| 2005/0191553 A1* | 9/2005 | Fujihara et al. ............. | 429/231.1 |
| 2006/0194109 A1* | 8/2006 | Watanabe et al. ........... | 429/231.1 |
| 2006/0275667 A1* | 12/2006 | Watanabe et al. ........... | 429/231.3 |

FOREIGN PATENT DOCUMENTS

| | | | | |
|---|---|---|---|---|
| JP | 3024636 B2 | 1/2000 | | |
| JP | 2001-307781 A | 11/2001 | | |
| JP | 2001307781 | * 11/2001 | ............ | H01M 10/44 |
| WO | 2004/102701 A1 | 11/2004 | | |
| WO | WO2004102701 | * 11/2004 | ............. | H01M 4/02 |

* cited by examiner

*Primary Examiner* — Ula C Ruddock
*Assistant Examiner* — Archer Dudley
(74) *Attorney, Agent, or Firm* — McDermott Will & Emery LLP

(57) ABSTRACT

Good cycle performance is obtained with a non-aqueous electrolyte secondary battery having a positive electrode, a negative electrode, and a non-aqueous electrolyte. The positive electrode contains as positive electrode active material a mixture of a lithium-manganese composite oxide and a lithium-transition metal composite oxide containing at least Ni and Mn as transition metals. The negative electrode contains as a negative electrode active material a material capable of intercalating and deintercalating lithium. Charging of the non-aqueous electrolyte secondary battery is controlled so that the end-of-charge voltage becomes higher than 4.3 V.

20 Claims, 3 Drawing Sheets

METHOD OF CHARGING AND DISCHARGING A NON-AQUEOUS ELECTROLYTE SECONDARY BATTERY

BACKGROUND OF THE INVENTION

1. Field of the Invention

The present invention relates to a method of charging and discharging a non-aqueous electrolyte secondary battery.

2. Description of Related Art

In recent years, a non-aqueous electrolyte secondary battery has drawn attention as a high energy density battery. In the non-aqueous electrolyte secondary battery, the negative electrode active material is composed of metallic lithium, a carbon material, or an alloy capable of intercalating and deintercalating lithium ions, and the positive electrode active material is composed of a lithium-transition metal composite oxide represented by the chemical formula $LiMO_2$ (where M is a transition metal).

A representative example of the lithium-transition metal composite oxide is lithium cobalt oxide ($LiCoO_2$), which has already been in commercial use as a positive electrode active material for non-aqueous electrolyte secondary batteries.

Materials containing Mn or Ni have also been researched. As an example of the materials containing Mn, manganese oxide having a spinel structure has been researched as an active material.

A problem with the non-aqueous electrolyte secondary battery that uses the manganese oxide having a spinel structure as an active material has been that the structure of the manganese oxide degrades due to the phase change associated with battery charging, causing the battery performance to deteriorate.

Japanese Patent No. 3024636 discloses that high-temperature storage performance of a battery can be prevented from degrading by adding a Li—Ni—Co composite oxide to such a manganese oxide having a spinel structure. However, the present inventors have conducted a study and as a result have found that the method disclosed in the patent publication cannot achieve sufficient cycle performance.

BRIEF SUMMARY OF THE INVENTION

Accordingly, it is an object of the present invention to provide a method of charging and discharging a battery whereby good battery cycle performance can be achieved, with a non-aqueous electrolyte secondary battery employing as its positive electrode active material a mixture of a lithium-transition metal composite oxide containing at least Ni and Mn as transition metals and a lithium-manganese composite oxide.

In order to accomplish the foregoing and other objects, the present invention provides a method of charging and discharging a non-aqueous electrolyte secondary battery comprising a positive electrode having a positive electrode active material made of a mixture of a lithium-transition metal composite oxide containing at least Ni and Mn as transition metals and a lithium-manganese composite oxide, a negative electrode having a negative electrode active material made of a material capable of intercalating and deintercalating lithium, and a non-aqueous electrolyte. The method comprises controlling charging of the non-aqueous electrolyte secondary battery so that the end-of-charge voltage of the non-aqueous electrolyte secondary battery becomes higher than 4.3 V.

According to the present invention, charging of a non-aqueous electrolyte secondary battery of the present invention is controlled so that the end-of-charge voltage becomes higher than 4.3 V, and thereby good cycle performance of the battery can be attained.

DETAILED DESCRIPTION OF THE INVENTION

Figure 1:
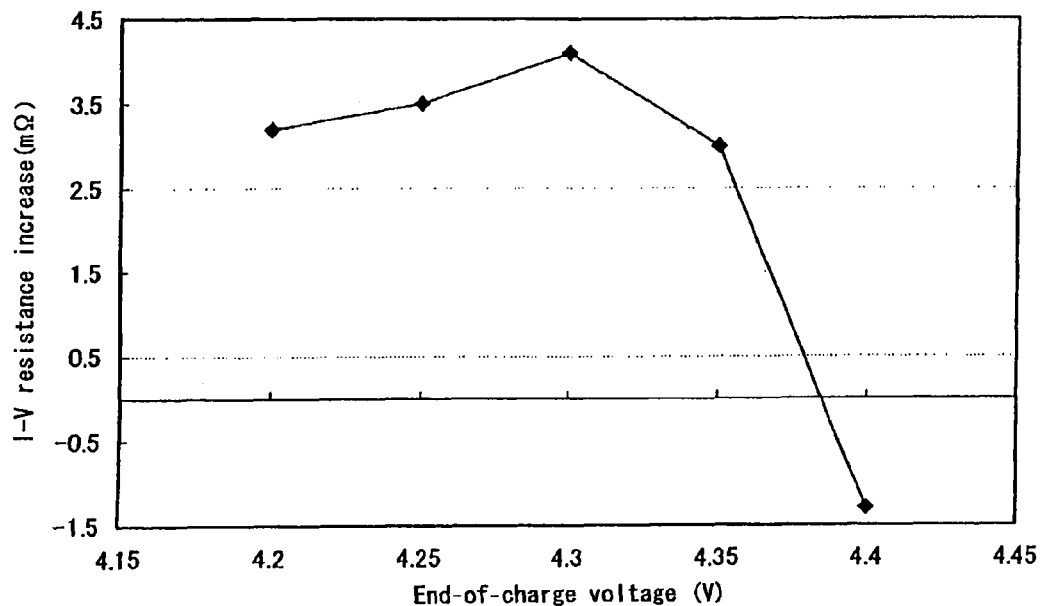
FIG. 1 is a graph illustrating the relationship between end-of-charge voltage and I-V resistance increase in a non-aqueous electrolyte secondary battery employing a positive electrode active material in which a lithium-manganese composite oxide is mixed with a lithium-transition metal composite oxide.

The present invention provides a method of charging and discharging a non-aqueous electrolyte secondary battery. The non-aqueous electrolyte secondary battery comprises: a positive electrode having a positive electrode active material made of a mixture of a lithium-transition metal composite oxide containing at least Ni and Mn as transition metals and a lithium-manganese composite oxide (not containing Ni); a negative electrode having a negative electrode active material made of a material capable of intercalating and deintercalating lithium; and a non-aqueous electrolyte. The method is characterized by controlling charging of the non-aqueous electrolyte secondary battery so that the end-of-charge voltage of the non-aqueous electrolyte secondary battery becomes higher than 4.3 V.

According to the present invention, charging of the battery is controlled so that the end-of-charge voltage becomes higher than 4.3 V, and thereby good cycle performance can be obtained. In the present invention, it is more preferable that the end-of-charge voltage be 4.34 V or higher.

In the present invention, the charging of a non-aqueous electrolyte secondary battery may be controlled so that the end-of-charge voltage of the battery becomes higher than 4.3 V with the use of a control circuit. Generally, the control circuit is incorporated in an apparatus using the non-aqueous electrolyte secondary battery, or in an apparatus using an assembled battery that comprises a plurality of unit cells, each of the unit cells being the non-aqueous electrolyte secondary battery, or within the non-aqueous electrolyte secondary battery or within the assembled battery.

It is preferable that the lithium-transition metal composite oxide in the present invention further contain cobalt. In other words, it is preferable that the lithium-transition metal composite oxide contain Ni, Mn, and Co as the transition metals. It is preferable that such a lithium-transition metal composite oxide be represented by the chemical formula $Li_aMn_xNi_y$-

$Co_zO_2$, where $0 \leq a \leq 1.3$, $x+y+z \leq 1$, $0 < x \leq 0.5$, $0 < y \leq 0.5$, and $0 \leq z \leq 0.5$. In the present invention, the lithium-transition metal composite oxide may further contain at least one additional element selected from the group consisting of B, Mg, Al, Ti, V, Fe, Co, Cu, Zn, Ga, Y, Zr, Nb, Mo, and In. The content of the at least one additional element should preferably be 2 mole % or less with respect to the total amount of the transition metals.

In the present invention, it is preferable that the lithium-manganese composite oxide have a spinel structure. The lithium-manganese composite oxide does not contain Ni but may further contain at least one additional element selected from the group consisting of B, Mg, Al, Ti, V, Fe, Co, Cu, Zn, Ga, Y, Zr, Nb, Mo, and In. The content of the additional element(s) should preferably be 2 mole % or less with respect to the manganese.

In the present invention, it is preferable that the weight ratio of the lithium-transition metal composite oxide to the lithium-manganese composite oxide be within the range of 9:1 to 1:9 (lithium-transition metal composite oxide:lithium-manganese composite oxide) by weight, more preferably within the range of 8:2 to 2:8, and still more preferably within the range of 8:2 to 4:6. If the proportion of the lithium-transition metal composite oxide or the proportion of the lithium-manganese composite oxide falls outside the ranges and becomes excessively large, high-temperature storage performance of the battery may degrade.

In the present invention, the solute of the non-aqueous electrolyte may be any lithium salt that is generally used as a solute in non-aqueous electrolyte secondary batteries. Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. In addition to these solutes, a lithium salt having an oxalato complex as anion may be contained in the non-aqueous electrolyte, and more preferably, lithium bis(oxalato)borate may be contained in the non-aqueous electrolyte.

The solvent of the non-aqueous electrolyte used in the present invention may be any solvent that has conventionally been used as a solvent for an electrolyte in non-aqueous electrolyte secondary batteries. Examples of the solvent include: cyclic carbonates, such as ethylene carbonate, propylene carbonate, butylene carbonate, and vinylene carbonate; and chain carbonates, such as dimethyl carbonate, methylethyl carbonate, and diethyl carbonate. Particularly preferable is a mixed solvent of a cyclic carbonate and a chain carbonate.

The negative electrode active material used in the present invention is not particularly limited, but is preferably a carbon material. From the viewpoint of the balance between output and regenerative power density, it is particularly preferable to use a material that shows a large potential change during charge-discharge operations.

Hereinbelow, the present invention is described in further detail based on examples thereof. It should be construed, however, that the present invention is not limited to the following examples but various changes and modifications are possible without departing from the scope of the invention.

Figure 4:
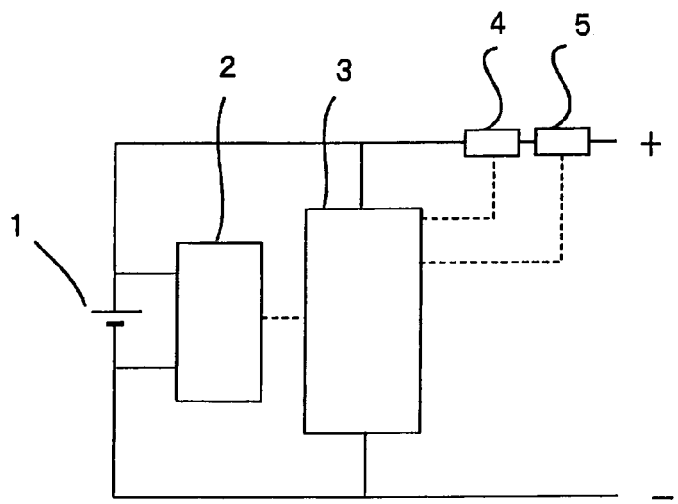
FIG. 4 is a schematic view illustrating a protection circuit and a control circuit for a non-aqueous electrolyte secondary battery.

FIG. 4 is a schematic view illustrating a protection circuit and a control circuit for a single non-aqueous electrolyte secondary battery. A non-aqueous electrolyte secondary battery 1 is provided with a protection circuit 2. The protection circuit 2 prevents the non-aqueous electrolyte secondary battery 1 from being excessively charged and discharged by monitoring the voltage and temperature of the non-aqueous electrolyte secondary battery 1. The control circuit 3 is provided within the secondary battery, or within an apparatus that employs the secondary battery. The control circuit 3 monitors the voltage of the secondary battery 1 and controls charging and discharging of the non-aqueous electrolyte secondary battery by starting or stopping the charging and discharging with a charge control switch 4 and a discharge control switch 5.

Figure 5:
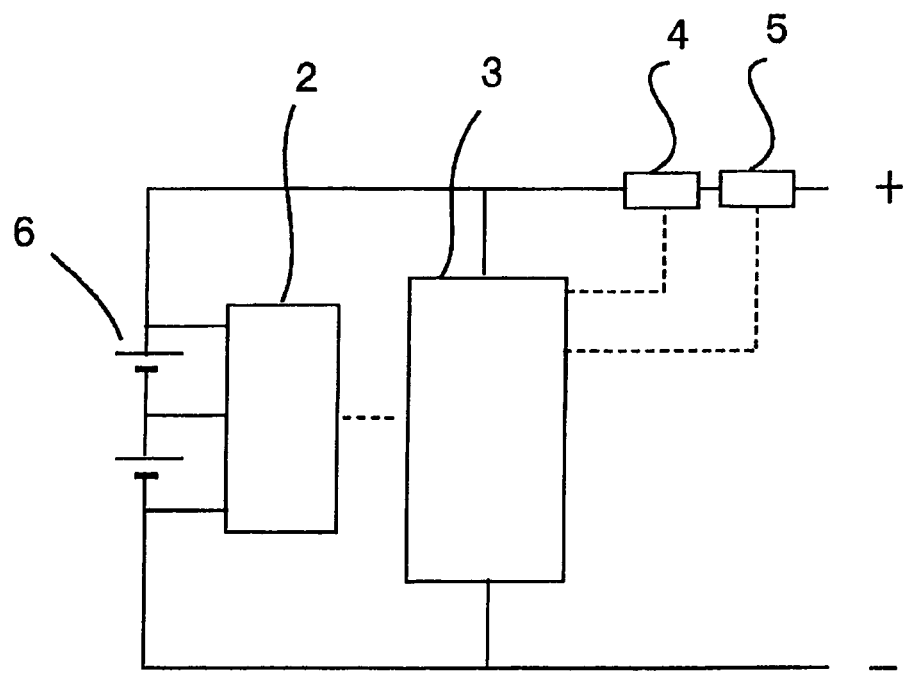
FIG. 5 is a schematic view illustrating a protection circuit and a control circuit for an assembled battery incorporating a plurality of unit cells, each being a non-aqueous electrolyte secondary battery.

FIG. 5 is a schematic view illustrating a protection circuit and a control circuit provided for an assembled battery 6 in which a plurality of non-aqueous electrolyte secondary batteries are incorporated as unit cells. The assembled battery 6 is provided with a protection circuit 2. The protection circuit 2 functions to monitor the voltage, temperature, and so forth of the unit cells in the assembled battery 6 and to protect the unit cells from overdischarge and so forth. A control circuit 3 is incorporated in an apparatus using the assembled battery 6 or within the assembled battery. The control circuit 3 monitors the voltage of the assembled battery 6 and controls charging and discharging of the assembled battery 6 with a charge control switch 4 and a discharge control switch 5. The control circuit 3 may control charging of the assembled battery 6 either by stopping charging of all the unit cells when one of the unit cells in the assembled battery 6 reaches a predetermined voltage, or by monitoring the overall voltage of the assembled battery 6 and stopping charging of all the unit cells when the monitored voltage reaches a predetermined voltage.

In the present invention, a control circuit incorporated either in an apparatus that uses a battery or within the battery as described above may control charging of the battery so that the end-of-charge voltage becomes higher than 4.3 V.

EXPERIMENT 1

Example 1

Preparation of Positive Electrode $Li_{1.15}Ni_{0.4}Co_{0.3}Mn_{0.3}O_2$, powder and $Li_{1.1}Mn_{1.9}O_4$ powder, serving as positive electrode active materials, were mixed at a weight ratio of 7:3 (lithium-transition metal composite oxide:lithium-manganese composite oxide), and then the resultant powder mixture was mixed with artificial graphite serving as a conductive agent so that the weight ratio of the powder mixture to the artificial graphite became 9:1, to thus prepare a positive electrode mixture. The prepared positive electrode mixture was mixed with a N-methyl-2-pyrrolidone (NMP) solution containing 5 weight % polyvinylidene fluoride (PVdF) as a binder agent so that the solid weight ratio became 95:5 (positive electrode mixture:binder agent), to thus prepare a slurry. The resultant slurry was applied onto both sides of a 20 μm-thick aluminum foil by doctor blading and then vacuum dried at 150° C. for 2 hours. A positive electrode was thus prepared.

Preparation of Negative Electrode

PVdF serving as a binder agent was dissolved into NMP to prepare an NMP solution, and the resultant solution was mixed with graphite powder so that the weight ratio of graphite powder to PVdF became 85:15 (graphite powder:PVdF), to prepare a slurry. The resultant slurry was applied onto both sides of a 20 μm-thick copper foil by doctor blading. A negative electrode was thus prepared.

Preparation of Electrolyte Solution $LiPF_6$ was dissolved at a concentration of 1 mole/liter into a mixed solvent of 1:1 volume ratio of ethylene carbonate and diethyl carbonate. An electrolyte solution was thus prepared.

Construction of Battery

An ion-permeable microporous polypropylene film serving as a separator was wound around several times, and thereafter the negative electrode and the positive electrode with the separator were spirally wound around a multiple number of times so that the negative electrode and the positive electrode oppose each other across the separator. Thus, an electrode assembly was prepared. The prepared electrode assembly was inserted into a battery can. Thereafter, the above-described electrolyte solution was poured into the battery can, and the battery can was then sealed. Thus, a 1200 mAh battery was prepared.

I-V Resistance Measurement Test

I-V resistance was determined by the following test.

The battery was discharged to 2.4 V according to the charge-discharge test condition set out in Cycle Test below, and the following tests were carried out.

(1) 600 mA charge (10 seconds)→rest (10 minutes)→600 mA discharge (10 seconds)→rest (10 minutes)

(2) 1200 mA charge (10 seconds)→rest (10 minutes)→1200 mA discharge (10 seconds)→rest (10 minutes)

(3) 2400 mA charge (10 seconds)→rest (10 minutes)→2400 mA discharge (10 seconds)→rest (10 minutes)

The above charge-discharge tests (1) to (3) were carried out in that order at room temperature. The highest potential reached during each charging was measured, and from the gradient of potential values with respect to current values, I-V resistances were determined.

Cycle Test

After confirming the rated capacity of the battery, the battery was charged and discharged at 20 W with an end-of-charge voltage of 4.35 V and an end-of-discharge voltage of 2.4 in a constant temperature bath that was kept at 25° C., and this cycle was repeated for 100 hours. After the cycle test, the I-V resistance of the battery at a 50% charged state was measured. The measured I-V resistance was compared with the I-V resistance obtained before the cycle test, to obtain an I-V resistance increase.

The results of the tests are shown in Table 1 and FIG. 1.

Example 2

Each of the tests was carried out in the same manner as in Example 1 except that the end-of-charge voltage was set at 4.40 V. The results are also shown in Table 1 and FIG. 1.

Comparative Example 1

Each of the tests was carried out in the same manner as in Example 1 except that the end-of-charge voltage was set at 4.20 V. The results are also shown in Table 1 and FIG. 1.

Comparative Example 2

Each of the tests was carried out in the same manner as in Example 1 except that the end-of-charge voltage was set at 4.25 V. The results are also shown in Table 1 and FIG. 1.

Comparative Example 3

Each of the tests was carried out in the same manner as in Example 1 except that the end-of-charge voltage was set at 4.30 V. The results are also shown in Table 1 and FIG. 1.

TABLE 1

|  | End-of-charge voltage (V) | I-V resistance increase (mΩ) |
|---|---|---|
| Example 1 | 4.35 | 3.0 |
| Example 2 | 4.40 | −1.3 |
| Comparative Example 1 | 4.20 | 3.2 |
| Comparative Example 2 | 4.25 | 3.5 |
| Comparative Example 3 | 4.30 | 4.1 |

The results shown in Table 1 and FIG. 1 clearly demonstrate that, by setting the end-of-charge voltage to be higher than 4.3 V, the I-V resistance increase can be made smaller than the conventional case, in which the end-of-charge voltage is 4.2 V, and thus higher cycle performance can be achieved. Particularly desirable results can be obtained by setting the end-of-charge voltage to be 4.34 V or higher, as clearly seen from FIG. 1.

EXPERIMENT 2

Various positive electrodes were prepared with varying of the mixture ratio of the lithium-transition metal composite oxide to the lithium-manganese composite oxide, to prepare non-aqueous electrolyte secondary batteries. The batteries were charged and discharged with an end-of-charge voltage of 4.2 V or 4.4 V. Thereafter, the positive electrodes were taken out, and the lattice constants of the lithium-transition metal composite oxide in each positive electrode were determined using a powder X-ray diffraction analysis.

Example 3

A battery was prepared in the same manner as described in EXPERIMENT 1 above, except that the $Li_{1.15}Ni_{0.4}Co_{0.3}Mn_{0.3}O_2$ powder and the $Li_{1.1}Mn_{1.9}O_4$ powder, serving as positive electrode active materials, were mixed at a weight ratio of 8:2 (lithium-transition metal composite oxide:lithium-manganese composite oxide). The battery thus prepared was charged at 1 A to 4.4 V.

Example 4

A battery was prepared in the same manner as described in EXPERIMENT 1 above, except that the $Li_{1.15}Ni_{0.4}Co_{0.3}Mn_{0.3}O_2$ powder and the $Li_{1.1}Mn_{1.9}O_4$ powder, serving as positive electrode active materials, were mixed at a weight ratio of 6:4 (lithium-transition metal composite oxide:lithium-manganese composite oxide). The battery thus prepared was charged at 1 A to 4.4 V.

Example 5

A battery was prepared in the same manner as described in EXPERIMENT 1 above, except that the $Li_{1.15}Ni_{0.4}Co_{0.3}Mn_{0.3}O_2$ powder and the $Li_{1.1}Mn_{1.9}O_4$ powder, serving as positive electrode active materials, were mixed at a weight ratio of 4:6 (lithium-transition metal composite oxide:lithium-manganese composite oxide). The battery thus prepared was charged at 1 A to 4.4 V.

Example 6

A battery was prepared in the same manner as described in EXPERIMENT 1 above, except that the $Li_{1.15}Ni_{0.4}Co_{0.3}Mn_{0.3}O_2$ powder and the $Li_{1.1}Mn_{1.9}O_4$ powder, serving as positive electrode active materials, were mixed at a weight ratio of 2:8 (lithium-transition metal composite oxide:lithium-manganese composite oxide). The battery thus prepared was charged at 1 A to 4.4 V.

Comparative Example 4

A battery was prepared in the same manner as described in EXPERIMENT 1 above, except that the $Li_{1.15}Ni_{0.4}Co_{0.3}Mn_{0.3}O_2$ powder and the $Li_{1.1}Mn_{1.9}O_4$ powder, serving as positive electrode active materials, were mixed at a weight ratio of 8:2 (lithium-transition metal composite oxide:lithium-manganese composite oxide). The battery thus prepared was charged at 1 A to 4.2 V.

Comparative Example 5

A battery was prepared in the same manner as described in EXPERIMENT 1 above, except that the $Li_{1.15}Ni_{0.4}Co_{0.3}Mn_{0.3}O_2$ powder and the $Li_{1.1}Mn_{1.9}O_4$ powder, serving as positive electrode active materials, were mixed at a weight ratio of 6:4 (lithium-transition metal composite oxide:lithium-manganese composite oxide). The battery thus prepared was charged at 1 A to 4.2 V.

Comparative Example 6

A battery was prepared in the same manner as described in EXPERIMENT 1 above, except that the $Li_{1.15}Ni_{0.4}Co_{0.3}Mn_{0.3}O_2$ powder and the $Li_{1.1}Mn_{1.9}O_4$ powder, serving as positive electrode active materials, were mixed at a weight ratio of 4:6 (lithium-transition metal composite oxide:lithium-manganese composite oxide). The battery thus prepared was charged at 1 A to 4.2 V.

Comparative Example 7

A battery was prepared in the same manner as described in EXPERIMENT 1 above, except that the $Li_{1.15}Ni_{0.4}Co_{0.3}Mn_{0.3}O_2$ powder and the Li1.1Mn1.9O4 powder, serving as positive electrode active materials, were mixed at a weight ratio of 2:8 (lithium-transition metal composite oxide:lithium-manganese composite oxide). The battery thus prepared was charged at 1 A to 4.2 V.

Comparative Example 8

A battery was prepared in the same manner as described in EXPERIMENT 1 above, except that $Li_{1.15}Ni_{0.4}Co_{0.3}Mn_{0.3}O_2$ powder alone was used as positive electrode active material. The battery thus prepared was charged at 1 A to 4.2 V.

Comparative Example 9

A battery was prepared in the same manner as described in EXPERIMENT 1 above, except that $Li_{1.15}Ni_{0.4}Co_{0.3}Mn_{0.3}O_2$ powder alone was used as positive electrode active material. The battery thus prepared was charged at 1 A to 4.4 V.

The positive electrodes were taken out from the batteries charged according to the above-described manners, and the lattice constants of the lithium-transition metal composite oxide in each of the positive electrodes were determined using a powder X-ray diffraction analysis. The test results are shown in Tables 2 and 3. Table 2 shows the results of the charging with an end-of-charge voltage of 4.4 V, while Table 3 shows the results of the charging with an end-of-charge voltage 4.2 V.

Figure 2:
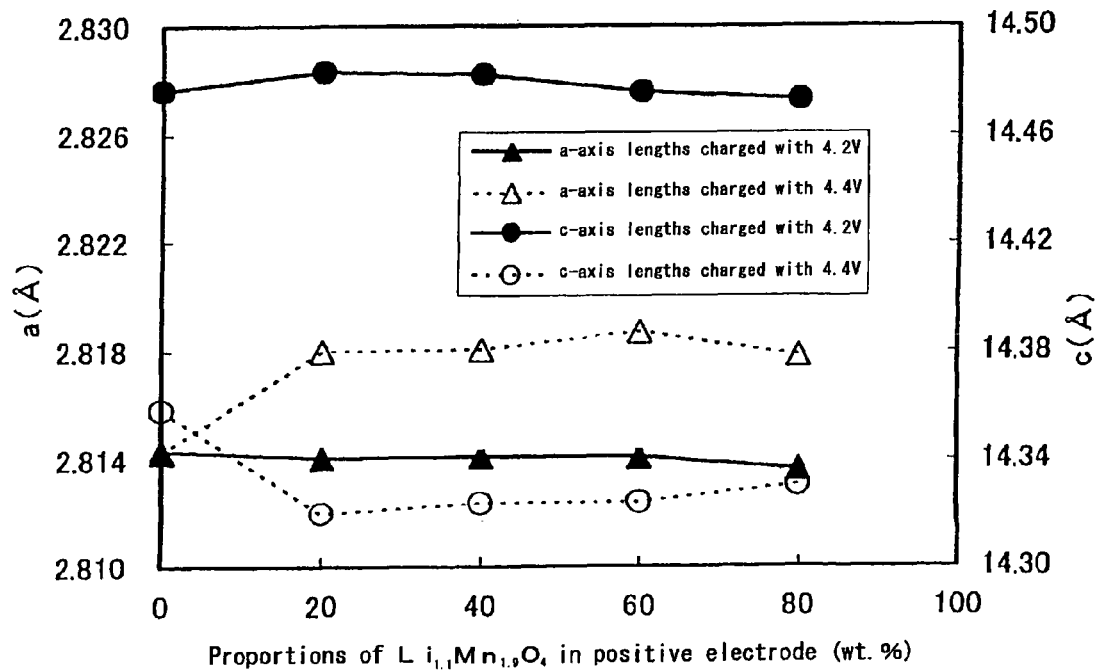
FIG. 2 is a graph illustrating the relationship between proportions of the lithium-manganese composite oxide added and the lattice constants of the lithium-transition metal composite oxide when charged at 4.2 V and when charged at 4.4 V.
Figure 3:
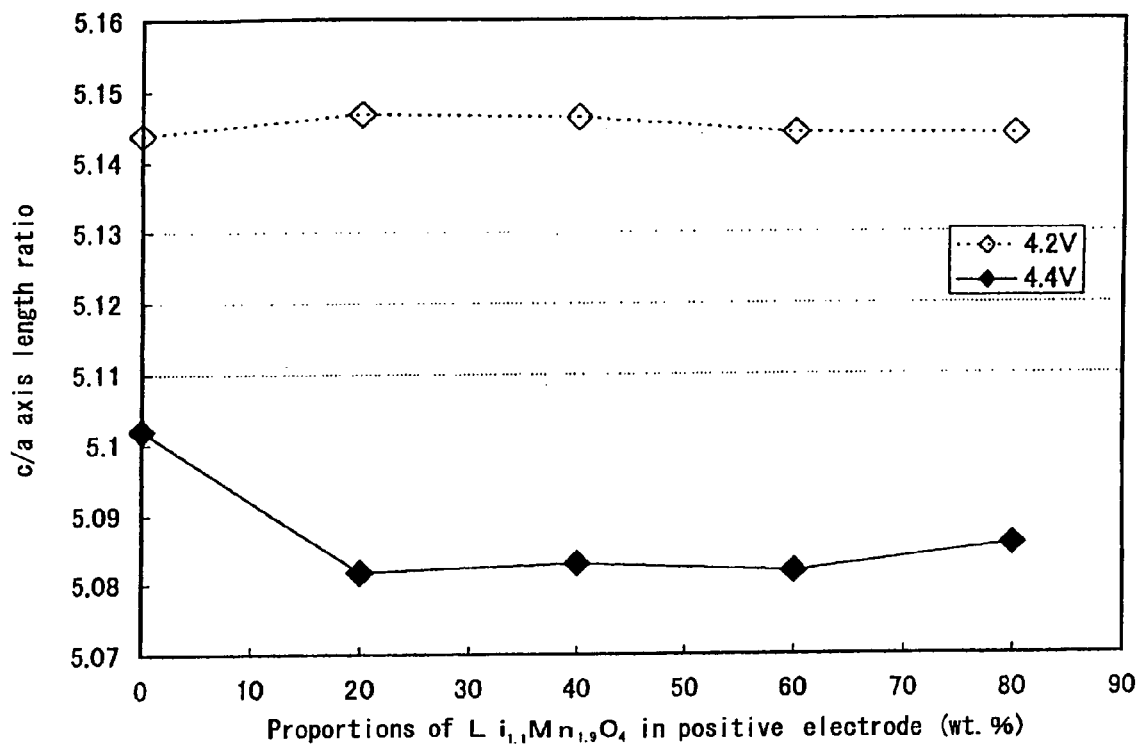
FIG. 3 is a graph illustrating the relationship between proportions of the added lithium-manganese composite oxide and the ratios of c-axis length/a-axis length in the lithium-transition metal composite oxide when charged at 4.2 V and when charged at 4.4 V.

FIG. 2 illustrates the relationship of proportion of the lithium-manganese composite oxide mixed in the positive electrode active materials with a-axis length and c-axis length of the lithium-transition metal composite oxide charged with 4.2 V and 4.4 V. FIG. 3 illustrates the relationship between proportion of the lithium-manganese composite oxide mixed in the positive electrode active materials and ratio of c-axis length/a-axis length of the lithium-transition metal composite oxide charged with 4.2 V and 4.4 V.

TABLE 2

| | Proportion of $Li_{1.1}Mn_{1.9}O_4$ in positive electrode (wt. %) | a-axis length (Å) | c-axis length (Å) | c/a axis length ratio |
|---|---|---|---|---|
| Example 3 | 20 | 2.8180 | 14.3200 | 5.081 |
| Example 4 | 40 | 2.8180 | 14.3238 | 5.082 |
| Example 5 | 60 | 2.8187 | 14.3241 | 5.081 |
| Example 6 | 80 | 2.8178 | 14.3305 | 5.085 |
| Comparative Example 9 | 0 | 2.8142 | 14.3582 | 5.102 |

TABLE 3

| | Proportion of $Li_{1.1}Mn_{1.9}O_4$ in positive electrode (wt. %) | a-axis length (Å) | c-axis length (Å) | c/a axis length ratio |
|---|---|---|---|---|
| Comparative Example 4 | 20 | 2.8140 | 14.4833 | 5.143 |
| Comparative Example 5 | 40 | 2.8141 | 14.4821 | 5.144 |
| Comparative Example 6 | 60 | 2.8141 | 14.4758 | 5.146 |
| Comparative Example 7 | 80 | 2.8136 | 14.4730 | 5.146 |
| Comparative Example 8 | 0 | 2.8143 | 14.4763 | 5.143 |

As seen from Tables 2, 3 and FIG. 2, when charged at 4.2 V, the lattice constants of the lithium-transition metal composite oxide in the positive electrodes of the batteries were almost the same, irrespective of the proportions of the lithium-manganese composite oxide in the mixtures. On the other hand, when charged at 4.4 V, it was seen that both the a-axis length and the c-axis length showed changes from those in the 4.2 V charging, in the cases that the lithium-manganese composite oxide was added. In addition, in the case that no lithium-manganese composite oxide was added, the c-axis length alone changed slightly while the a-axis length showed almost no change. This is also clearly seen from FIG. 3.

Thus, substantial changes in the lattice constants of the lithium-transition metal composite oxide were observed between when the batteries were charged at 4.2 V and when the batteries were charged at 4.4 V, in the cases that the lithium-manganese composite oxide was added. This is believed to indicate that the addition of the lithium-manganese composite oxide to the lithium-transition metal composite oxide caused the lattice constants to change, reducing crystal strain. It is believed that due to this reduction of crystal strain, high cycle performance was attained even with a high end-of-charge voltage only in the cases that a lithium-manganese composite oxide was added.

As will be appreciated from the description above, setting the end-of-charge voltage to be higher than 4.3 V according to the present invention enables a non-aqueous electrolyte lithium secondary battery that employs a positive electrode active material in which a lithium-transition metal composite oxide and a lithium-manganese composite oxide are mixed together to achieve good cycle performance.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2005-279950 filed Sep. 27, 2005, which is incorporated herein by reference.

What is claimed is:

1. A method of charging and discharging a non-aqueous electrolyte secondary battery comprising a positive electrode having a positive electrode active material made of a mixture of a lithium-transition metal composite oxide containing at least Ni and Mn as transition metals and a lithium-manganese composite oxide having a spinel structure and not containing Ni and optionally containing, B, Mg, Al, Ti, V, Fe, Cu, Zn, Ga, Y, Zr, Nb, Mo, and In, a negative electrode having a negative electrode active material made of a material capable of intercalating and deintercalating lithium, and a non-aqueous electrolyte, said method comprising:

charging said non-aqueous electrolyte secondary battery so that the end-of-charge voltage of said non-aqueous electrolyte secondary battery becomes higher than 4.3 V.

2. The method according to claim 1, wherein said non-aqueous electrolyte secondary battery is incorporated in an apparatus or in an apparatus using an assembled battery having a plurality of unit cells, each of the unit cells being said non-aqueous electrolyte secondary battery; and said charging and discharging of said non-aqueous electrolyte secondary battery or each of said unit cells in the assembled battery are controlled by a control circuit that is incorporated in the apparatus incorporating said non-aqueous electrolyte secondary battery or in the apparatus incorporating said assembled battery, or within said non-aqueous electrolyte secondary battery or within said assembled battery.

3. The method according to claim 1, wherein said lithium-transition metal composite oxide further contains Co.

4. The method according to claim 1, wherein said lithium-transition metal composite oxide is represented by the chemical formula $Li_aMn_xNi_yCo_zO_2$, where $0 \leq a \leq 1.3$, $x+y+z \leq 1$, $0 < x \leq 0.5$, $0 < y \leq 0.5$, and $0 \leq z \leq 0.5$.

5. The method according to claim 2, wherein said lithium-transition metal composite oxide further contains Co.

6. The method according to claim 2, wherein said lithium-transition metal composite oxide is represented by the chemical formula $Li_aMn_xNi_yCo_zO_2$, where $0 \leq a \leq 1.3$, $x+y+z \leq 1$, $0 < x \leq 0.5$, $0 < y \leq 0.5$, and $0 \leq z \leq 0.5$.

7. The method according to claim 3, wherein said lithium-transition metal composite oxide is represented by the chemical formula $Li_aMn_xNi_yCo_zO_2$, where $0 \leq a \leq 1.3$, $x+y+z \leq 1$, $0 < x \leq 0.5$, $0 < y \leq 0.5$, and $0 \leq z \leq 0.5$.

8. The method according to claim 5, wherein: said lithium-transition metal composite oxide is represented by the chemical formula $Li_aMn_xNi_yCo_zO_2$, where $0 \leq a \leq 1.3$, $x+y+z \leq 1$, $0 < x \leq 0.5$, $0 < y \leq 0.5$, and $0 \leq z \leq 0.5$.

9. The method according to claim 1, wherein the end-of-charge voltage is not less than 4.4 V.

10. The method according to claim 2, wherein the end-of-charge voltage is not less than 4.4 V.

11. The method according to claim 3, wherein the end-of-charge voltage is not less than 4.4 V.

12. The method according to claim 4, wherein the end-of-charge voltage is not less than 4.4 V.

13. The method according to claim 6, wherein the end-of-charge voltage is not less than 4.4 V.

14. The method according to claim 6, wherein the end-of-charge voltage is not less than 4.4 V.

15. The method according to claim 1, wherein a mixture ratio of the lithium-transition metal composite oxide and the lithium-manganese composite oxide is 8:2 to 4:6.

16. The method according to claim 2, wherein a mixture ratio of the lithium-transition metal composite oxide and the lithium-manganese composite oxide is 8:2 to 4:6.

17. The method according to claim 3, wherein a mixture ratio of the lithium-transition metal composite oxide and the lithium-manganese composite oxide is 8:2 to 4:6.

18. The method according to claim 4, wherein a mixture ratio of the lithium-transition metal composite oxide and the lithium-manganese composite oxide is 8:2 to 4:6.

19. The method according to claim 5, wherein a mixture ratio of the lithium-transition metal composite oxide and the lithium-manganese composite oxide is 8:2 to 4:6.

20. The method according to claim 6, wherein a mixture ratio of the lithium-transition metal composite oxide and the lithium-manganese composite oxide is 8:2 to 4:6.

* * * * *